July 17, 1951 H. I. F. EVERNDEN ET AL 2,560,759
BEARING SUPPORT FOR A TWO-PART UNIVERSALLY
COUPLED TRANSMISSION SHAFT
Filed Aug. 4, 1947 2 Sheets-Sheet 2
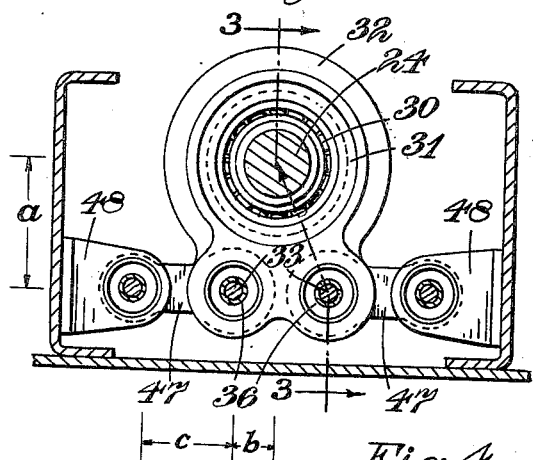
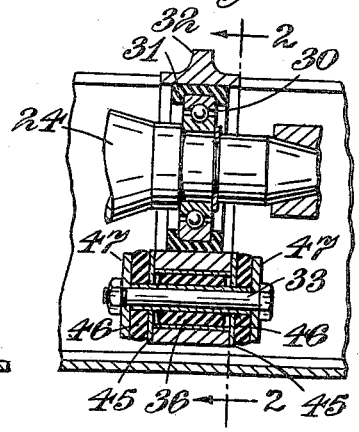
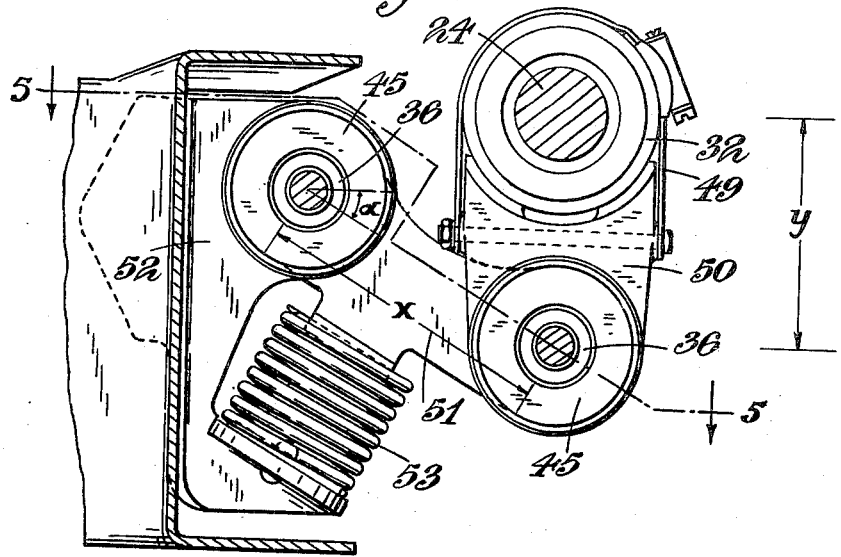
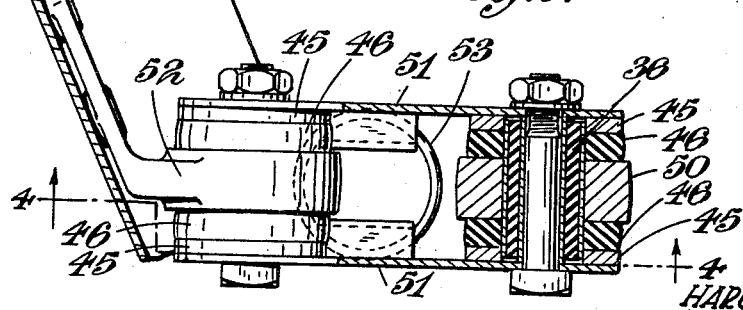
INVENTOR
HAROLD I. F. EVERNDEN
& FREDERICK J. HARDY
by Wilkinson Mawhinney
ATTORNEYS Patented July 17, 1951

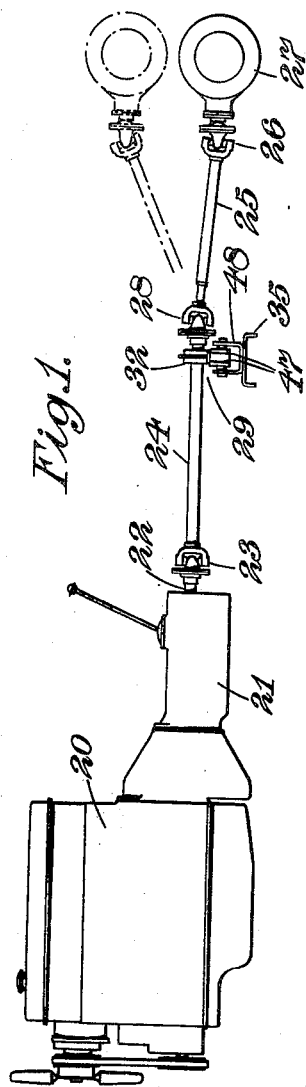

2,560,759

UNITED STATES PATENT OFFICE 2,560,759

BEARING SUPPORT FOR A TWO-PART UNIVERSALLY COUPLED TRANSMISSION SHAFT

Harold Ivan Frederick Evernden, Hazelwood, Duffield, near Derby, and Frederick James Hardy, Alvaston, Derby, England, assignors to Rolls-Royce Limited, Derby, England, a British company Application August 4, 1947, Serial No. 766,042
In Great Britain October 16, 1945

Section 1, Public Law 690, August 8, 1946
Patent expires October 16, 1965

3 Claims. (Cl. 180—85)

This invention relates to power-transmission systems of motor vehicles in which the power is transmitted from an engine on the vehicle to a driving axle of the vehicle through a shaft and is concerned with transmission systems of the kind in which the shaft is divided at a suitable point in its length, the two parts are coupled together by a universal joint (usually of the Cardan type) and the part of the shaft coupled to the engine is mounted on the vehicle chassis by a bearing adjacent the universal joint. The division of the shaft into two parts reduces the length of shaft subject to vertical movement on deflection of the driving axle and may also be utilised to avoid the necessity for a tunnel in the floor of the vehicle to clear the shaft.

The velocity-ratio of the transmission through a universal joint is not uniform throughout its rotation so that there is a torque variation having a frequency of once per revolution and this imposes on the bearing adjacent the universal joint a cyclical loading which is of a frequency equal to twice the speed of the shaft. When the bearing which supports the shaft adjacent the universal joint is mounted rigidly on the vehicle chassis or body, impressed vibrations are transmitted to the vehicle chassis or body and may produce roughness of running or noise. In order to prevent the transmission of vibraiton from the shaft to the vehicle chassis or body, it has been proposed to mount the bearing by an elastic ring in an outer sleeve and to mount the sleeve on the vehicle chassis by frictional damping means which damps movement of the bearing relatively to the chassis, in a plane normal to the shaft, equally in all directions.

According to the present invention there is provided a transmission system of the kind specified in which the bearing adjacent the universal joint is mounted on the vehicle chassis or body by resilient means affording freedom for relative movement between the bearing and the chassis or body in a plane substantially normal to the shaft and providing a greater restraint to such movement in a vertical direction than in a horizontal direction. The greater restraint in a vertical direction is desirable since the vertical component of the cyclic loading on the bearing is less than the horizontal component of the loading and the relative degrees of restraint in the two directions can be selected in accordance with the relative magnitudes of the components of the cyclic loading of the two directions so as to minimise the transmission of vibration without allowing the bearing unnecessary freedom of movement relatively to the chassis.

In addition, relatively large component forces in the vertical plane arise from thrust in the sliding joint in the rear shaft due to motion of the latter in springing; for this reason it was considered necessary that the bearing should be substantially rigid in this plane. However, it has been found to be desirable to introduce a degree of resilience in the vertical plane since the vertical component of the cyclical loading though of less order than the horizontal component gave rise to vibrational effects on the chassis.

It is a feature of this invention therefore to provide resilient restraint in all directions which is less in the horizontal plane than in the vertical plane to accommodate the relatively large vertical component arising from thrust in the sliding joint, whilst providing a degree of resilience to damp out the vertical component of the cyclical loading.

According to another feature of the invention there is provided a transmission system of the kind specified above in which the bearing adjacent the universal joint in the shaft is mounted by means of at least one pivot on the vehicle chassis or body to be free to move transversely of the shaft and resilient means is provided to restrain the pivotal movement. The freedom for pivotal movement may be provided by the deformation of an elastic member which also provides the resilient restraint.

In one arrangement in accordance with this invention, the bearing is pivoted on a link which is pivoted on the chassis or body so that the bearing has freedom to move in all directions in a plane substantially normal to the shaft. With this arrangement resilient restraint may be provided to pivotal movement of the link relatively both to the bearing and to the chassis or body and the parts being so arranged that restraint to horizontal movement of the bearing due to resilient restraint to movement about the pivots is less than restraint to vertical movement. The natural frequency of vibration of the mounting should in general be low so that synchronism with the impressed vibrations is only likely to occur at low speeds of the transmission shaft.

According to a further feature of the invention frictional damping means is also provided for damping movement of the bearing relatively to the chassis. Preferably the frictional damping means becomes operative only after a predetermined movement of the bearing relatively to the chassis.

A number of embodiments of the present invention will now be described, by way of example, with reference to the accompanying drawings in which—

Figure 1 is a side elevation of a vehicle transmission system incorporating a transmission shaft mounted in accordance with the present invention, Figure 2 is a section on the line 2—2 of Figure 3 showing one construction of the shaft mounting, Figure 3 is a section on the line 3—3 of Figure 2, Figure 4 shows another construction according to this invention, this figure being taken on the line 4—4 of Figure 5, and Figure 5 is a section on the line 5—5 of Figure 4.

As shown in Figure 1 the vehicle is driven by an engine 20 through a gear-box 21 and the output shaft 22 of the gear-box is connected by a universal joint 23 of the Cardan type to the front half 24 of the transmission shaft.

The rear part 25 of the transmission shaft is coupled by universal joint 26 of the Cardan type to the differential gear 27 driving the rear wheels of the vehicle. The parts 24 and 25 of the transmission shaft are coupled together by a universal joint 28 of the Cardan type and the rear end of the part 24 of the transmission shaft is supported from the vehicle chassis by a mounting 29 which is shown in section in Figures 2 and 3. It will be understood that the rear end of the shaft 24 could be supported from the vehicle body instead of from the vehicle chassis although the latter arrangement will be the more usual one. As shown in Figure 2 the shaft 24 is journalled in a ball bearing 30 which is mounted by means of a rubber or other resilient ring 31 in a housing 32. The bearing housing 32 is pivoted to a pair of links 47 which, in turn, are pivoted in brackets 48 carried by the vehicle chassis. Each of the pivotal connections to the housing is effected by means of a rubber-lined bush 36 of known construction which is a tight fit in the bore in the housing and is clamped on the pivot pin 33 so that the pivotal movement of the housing on the pin is accommodated by elastic deformation of the rubber lining of the bush. It will be appreciated that any substitute for rubber may be employed to line the bush and the word "rubber" is herein employed to include any rubber substitute. A friction disc 45 is provided on each side of the bearing housing 32 and is pressed against it by a rubber disc 46 which is compressed between the friction disc 45 and the link 47. With small oscillations, the rubber discs 46 will yield in torsion, thereby assisting in providing resilient restraint, but for greater oscillations the friction discs 45 will slip on the bearing housing to provide the frictional damping.

Alternatively or in addition friction discs 45 and rubber discs 46 may be provided between the links 47 and the brackets 48. Thus frictional damping is provided between the housing and the links and/or between the links and the brackets.

The general geometry of the layout in Figures 2 and 3 and the resilience in torsion of the bushes 36 and discs 46 is such that the horizontal movement is less restrained than the vertical movement.

It will be clear that if the pivotal axes of links 47 on the bearing housing 32 were to be contained in a horizontal plane passing through the axis of bearing 30 then (assuming that only torsional restraint is considered) the resilient restraint to horizontal movement would be greater than the resilient restraint to vertical movement, because in this case the horizontal restraint would be infinite. Contrariwise, if the horizontal plane containing the links 47 were to be located at an infinite distance below the bearing 30 then the horizontal restraint to the movement of the bearing housing would be infinitely small. It will be clear therefore that between these two positions of the horizontal plane containing the pivotal axes of the links 47 on the bearing housing 32, there is a position in which the restraints to horizontal and vertical movement of the bearing housing 32 are equal and in accordance with this invention the distance of the plane containing the pivotal axes of links 47 on the bearing housing from a horizontal plane through the axis of the bearing 30 is selected to be greater than the distance of the said plane when in the position in which the restraints are equal, so that thereby the resilient restraint to horizontal movement of the bearing housing 32 is less than the resilient restraint to vertical movement.

With the horizontal link arrangement of Figures 2 and 3, if $c$ is the length of each link 47 measured between the pivotal axes of its ends, if $a$ is the distance by which the horizontal plane containing the links 47 is offset from the axis of the shaft 24, and $b$ is the distance by which the pivotal axis of that end of a link 47 which is pivoted to the bearing housing 32, is offset from a vertical plane through the axis of shaft 24, then it can be shown that subject to the following assumptions, the resilient restraint to horizontal movements of the bearing housing 32 will be less than the resilient restraint to vertical movements of the bearing housing if $$\frac{2a^2}{c} \cdot \frac{c+b}{c^2+2cb+2b^2} > 1$$

In arriving at this expression it is assumed that since only small deflections of the bearing housing and thus only small angular displacements of the links at their pivots occur, the resilient restraint in torsion of the bushes need only be considered and that radial deflections in the bushes may be neglected as may also direct loads in the links.. It will be appreciated that since the two links 47 and a portion of the housing are all in line, pivotal movement can only occur if the effective length of the links increases; such increase is provided by compression of the rubber bushes.

In the construction shown in Figures 4 and 5 the bearing housing is secured by a strap 49 on a seating 50 which is pivoted on one end of a link 51. The other end of the link is pivoted on a bracket 52 secured to the vehicle chassis. Both pivotal joints comprise a rubber-lined bush 36, friction discs 45 and rubber discs 46 arranged to provide resilient restraint to and frictional damping of the pivotal movements as already described. The link 51 is also supported from the bracket 52 by a spring 53 which serves to carry the weight of the shaft.

With this arrangement the housing 32 can oscillate about the pivot between its seating 50 and the link 51 in response to the horizontal component of the loading on the bearing under the resilient restraint of the bush 36 in this pivot. Vertical movement of the bearing housing 32 is accommodated by the links 51 rocking in the bracket 52 and also turning relatively to the seating 50 so that vertical movement of the bearing housing is restrained resiliently by the two rubber bushes 36 in the two pivots. The arrangement is such that a given vertical movement of the housing will produce about the same pivotal movement at each pivot as would an equal horizontal movement of the housing produce at one pivot so that vertical movement of the housing is subjected to greater resilient restraint than horizontal movement. Pivotal movement of the link 51 is also resiliently restrained by the spring 53 and the weight of the shaft acting in opposition, so that the spring 53 assists in increasing the resilient restraint to vertical movement of the housing. The relative degrees of restraint in the two directions can be selected by a suitable selection of the inclination of the arm 51 to the horizontal, the length of the arm and the rate of the spring 53.

As with the previous construction the disposition of the link 51 in relation to the axis of the shaft 24 is such that the restraint to horizontal movement of the bearing housing 32 is less than that to vertical movement of the bearing housing.

In this arrangement, the restraint to vertical movement is independent of the distance of the pivotal axis of the link 51 on the bearing housing below the horizontal planes through axis of the bearing 30, whereas the horizontal restraint decreases as this distance increases so that for any given length of the link 51 between its pivotal axes and for any given angular position of that link there is a value of the distance between the horizontal plane through the axis of the bearing 30 and the point at which the link 51 is pivoted to the bearing housing, for which the resilient restraint to horizontal movement of the bearing housing is equal to the resilient restraint to vertical movement of the bearing housing.

It is arranged in accordance with this invention that the distance between the horizontal plane through the axis of shaft 24 and the point at which the link 51 is pivoted to the bearing housing 32 is greater than the value of this distance at which the resilient restraints become equal.

If $x$ is the length of link 51 between its pivotal axes, $y$ is the distance of the axis about which the link 51 is pivoted to the housing, below a horizontal plane through the bearing axis 24, and $a$ is the angle made by the centre line of the link 51 to the horizontal, it can be shown that subject to the following assumptions the resilient restraint to horizontal movements of the bearing housing 32 will be less than resilient restraint to vertical movements of the bearing housing if $$(y^2+x^2 \sin^2 a - xy \cdot \sin a) > x^2 \cos^2 a$$

In arriving at this expression it is assumed that since only small deflections of the bearing housing (and thus only small angular displacements of the link at its pivots) occur, the resilient restraint in torsion of the bushes need only be considered and that radial deflections in the bushes may be neglected as may also direct loads in the links.

In deriving the above expression it is also assumed that the reaction of the spring 53 throughout the motion of the link 51 is constant and for this purpose the spring should have a low rating. The spring 53 merely provides a reaction to the weight of the centre bearing and for that portion of the weight of the two shafts parts 24, 25 which it is called upon to bear.

It will be seen that in both the above described arrangements, the link means is asymmetrical with respect to the horizontal plane through the bearing axis, and in both cases the pivotal points of the links on the housing 32 are offset from said horizontal plane by a distance greater than the distance at which the reslient restraints become equal, it being common to both arrangements that as the pivotal point of a link on the bearing housing is moved farther from the bearing axis the horizontal restraint becomes less.

With all the arrangements described it is preferred the natural frequency of vibration of the mounting should be low so that synchronism with the impressed vibrations of the housings will only occur at a low speed of the transmission shaft which is not maintained in normal running. Under these conditions the frictional means damps the oscillations to prevent them becoming excessive. Under normal running conditions the frequency of impressed vibrations is higher than the natural frequency of the mounting so that resonant oscillations of the bearing housing will not occur. In all the above described constructions rubber is used for providing the elastic restraint, but it will be appreciated that the elastic restraint may be provided by the use of springs of a suitable rating which will maintain the housing in its normal position.

We claim:

1. In a vehicle comprising vehicle framing and a transmission having a two-part transmission shaft of which the two parts are interconnected by a universal coupling; a bearing support located adjacent said universal coupling for connecting one of the parts of said transmission shaft to the vehicle framing, which bearing support comprises a bearing engaged on said one shaft part, a housing accommodating said bearing, and for supporting the housing from the vehicle framing means comprising a pair of links each of length $(c)$ pivoted to said housing at a point offset from a horizontal plane through the axis of said bearing by a distance $(a)$ and each to extend substantially horizontally one on each side of a vertical plane through the bearing axis, said pivot points on the housing being each offset horizontally from said vertical plane a distance $(b)$ selected to satisfy the expression $$\frac{2a^2}{c} \cdot \frac{c+b}{c^2+2cb+2b^2} > 1$$

said links also being pivoted to said vehicle framing, a plurality of resilient bushes, one at least for each pivot point of said links, each resilient bush being connected to be torsionally stressed by pivoting of the associated link about the respective pivot point, whereby a greater resilient restraint is offered to vertical movement of the bearing housing in the plane of the bearing than is offered to horizontal movement in the plane of the bearing.

2. In a vehicle comprising vehicle framing and a transmission having a two-part transmission shaft of which the two parts are interconnected by a universal coupling; a bearing support located adjacent said universal coupling for connecting one of the parts of said transmission shaft to the vehicle framing, which bearing support comprises a bearing engaged on said one shaft part, a housing accommodating said bearing, and for supporting the housing from the vehicle framing means comprising a single link of length $(x)$ pivoted to said housing at a distance $(y)$ vertically below the axis of said bearing, extending laterally from the housing at an angle $a$ to the horizontal to be pivoted to the vehicle framing at a point offset from a vertical plane through the bearing axis, the length $(x)$, the distance $(y)$ and angle $(a)$ having values such that the expression $(y^2+x^2 \sin^2 a - xy.\sin a) > x^2 \cos^2 a$ is satisfied, and a pair of resilient bushes, one located at each pivot point and connected to be torsionally stressed by rocking of the link at that pivot point, whereby a greater resilient restraint is offered to vertical movement of the bearing housing in the plane of the bearing than is offered to horizontal movement in the plane of the bearing.

3. In a vehicle comprising vehicle framing and a transmission having a two-part transmission shaft of which the two parts are interconnected by a universal coupling; a bearing support located adjacent said universal coupling for connecting one of the parts of said transmission shaft to the vehicle framing, which bearing support comprises a bearing engaged on said one shaft part, a housing accommodating said bearing, and for supporting the housing from the vehicle framing means comprising a plurality of resilient bushes, and a link arrangement which is asymmetrical at least with respect to a horizontal plane through the bearing axis and which comprises at least one rocking link extending laterally from said housing which link is pivotally connected to said housing through one at least of said resilient bushes to stress the bush torsionally on pivotal movement relative to said housing, and which link is pivotally connected to said vehicle framing through another at least of said resilient bushes to stress the bushes torsionally on pivotal movement relative to said framing, the pivotal point of said link on said housing being offset from said horizontal plane through the bearing axis by a distance greater than that of the position of said pivotal point on the housing at which the resilient restraints to horizontal and vertical movements of said bearing housing are equal whereby there is greater resilient restraint to vertical movement of said housing in the plane of the bearing than is offered to horizontal movement in the plane of the bearing.

HAROLD IVAN FREDERICK EVERNDEN.
FREDERICK JAMES HARDY.

REFERENCES CITED

The following references are of record in the file of this patent:

UNITED STATES PATENTS

| Number | Name | Date |
|---|---|---|
| 1,445,125 | Batenburg | Feb. 13, 1923 |
| 2,195,647 | Guy | Apr. 2, 1940 |
| 2,238,737 | Hunter | Apr. 15, 1941 |
| 2,382,246 | McFarland | Aug. 14, 1945 |